United States Patent
Zhang et al.

(10) Patent No.: US 9,780,556 B2
(45) Date of Patent: Oct. 3, 2017

(54) VOLTAGE SOURCED CONVERTER WITH SEMICONDUCTOR MODULES HANDLING A DC CURRENT FAULT

(71) Applicant: The University of Birmingham, Birmingham (GB)

(72) Inventors: Xiao-Ping Zhang, Solihull (GB); Zhou Li, Nanjing (CN)

(73) Assignee: THE UNIVERSITY OF BIRMINGHAM, Birmingham (GB)

( * ) Notice: Subject to any disclaimer, the term of this patent is extended or adjusted under 35 U.S.C. 154(b) by 420 days.

(21) Appl. No.: 14/361,868

(22) PCT Filed: Nov. 29, 2012

(86) PCT No.: PCT/GB2012/052936
§ 371 (c)(1),
(2) Date: May 30, 2014

(87) PCT Pub. No.: WO2013/079937
PCT Pub. Date: Jun. 6, 2013

(65) Prior Publication Data
US 2014/0328093 A1    Nov. 6, 2014

(30) Foreign Application Priority Data
Nov. 30, 2011 (GB) .................... 1120640.6

(51) Int. Cl.
*H02M 7/483* (2007.01)
*H02M 1/32* (2007.01)
*H02H 7/125* (2006.01)

(52) U.S. Cl.
CPC .............. *H02H 7/125* (2013.01); *H02M 1/32* (2013.01); *H02M 7/483* (2013.01); *H02M 2007/4835* (2013.01)

(58) Field of Classification Search
CPC ............ H02M 7/42; H02M 7/44; H02M 7/48; H02M 7/483; H02M 7/487; H02M 7/49;
(Continued)

(56) References Cited

U.S. PATENT DOCUMENTS

2011/0019449 A1   1/2011   Katoh et al.
2011/0267852 A1   11/2011  Asplund
(Continued)

FOREIGN PATENT DOCUMENTS

CN    101976956 A      2/2011
WO    2010145689 A1    12/2010
(Continued)

OTHER PUBLICATIONS

Gemmell B et al: "Prospects of Multilevel VSC Technologies for Power Transmission", Transmission and Distribution Conference and Exposition, 2008. T&D. IEEE/PES, IEEE, Piscataway, NJ, USA, Apr. 21, 2008 (Apr. 21, 2008), pp. 1-16, XP031250215, ISBN: 978-1-4244-1903-6, p. 6-p. 7.
(Continued)

*Primary Examiner* — Timothy J Dole
*Assistant Examiner* — Ivan Laboy Andino
(74) *Attorney, Agent, or Firm* — Howard & Howard Attorneys PLLC

(57) ABSTRACT

A Voltage Sourced Converter, VSC, for a High Voltage Direct Current, HVDC, power converter, the VSC comprises a bridge circuit for each of one or more phases of an AG network. The bridge circuit has two arms, each arm connecting the supply to a pole of a DC terminal, wherein each arm of the bridge circuit has one or more semiconductor modules capable of being switched between an on-condition, in which a capacitor of the module is in-line in the arm of the bridge circuit, and an off-condition, in which the capacitor is out of line. A DC current fault detection arrange-
(Continued)

ment detects a fault arising at one or the other of the poles of the DC terminal within the DC converter or the DC grid. A controller responsive to the detection of the DC current fault switches one or more of the semiconductor modules in one of the arms of the bridge to the on and one or more of the semiconductor modules of the other arm of the bridge circuit to the off-condition.

8 Claims, 8 Drawing Sheets

(58) Field of Classification Search
CPC .. H02M 7/537; H02M 7/5387; H02M 7/5388; H02M 7/797; H02M 2007/4835; H02M 1/32; H02M 2001/322; H02M 2001/325; H02H 7/122; H02H 7/125
USPC ............ 363/16–17, 35, 37–43, 50–55, 363/56.01–56.05, 95–98, 123, 125, 127, 363/131–132, 135–136; 361/18, 91.7, 361/93.1, 93.9
See application file for complete search history.

(56) References Cited

U.S. PATENT DOCUMENTS

| | | | | |
|---|---|---|---|---|
| 2012/0026767 A1* | 2/2012 | Inoue | ................... | H02M 7/217 363/89 |
| 2012/0195084 A1* | 8/2012 | Norrga | ................... | H02M 7/483 363/127 |
| 2013/0128636 A1* | 5/2013 | Trainer | ................. | H02J 3/1857 363/65 |
| 2013/0208514 A1* | 8/2013 | Trainer | ..................... | H02J 3/36 363/35 |
| 2013/0208521 A1* | 8/2013 | Trainer | ..................... | H02J 3/36 363/126 |

FOREIGN PATENT DOCUMENTS

| | | |
|---|---|---|
| WO | 2011015227 A1 | 2/2011 |
| WO | 2011098117 A1 | 8/2011 |
| WO | 2011124260 A1 | 10/2011 |

OTHER PUBLICATIONS

PCT/GB2012/052936 International Search Report dated Feb. 26, 2014.
Mar. 23, 2012 U.K. Search Report for GB1120640.6.
Chinese Office Action dated Jan. 22, 2016 for Application No. 2016011901631130.

\* cited by examiner

VOLTAGE SOURCED CONVERTER WITH SEMICONDUCTOR MODULES HANDLING A DC CURRENT FAULT

FIELD OF THE INVENTION

The present invention relates to power converters, and more particularly to a Voltage Sourced Converter (VSC) for use in High Voltage Direct Current (HVDC) system, and to control of DC faults therein.

BACKGROUND

A typical configuration of an HVDC power transmission system has two converter stations that are linked by DC transmission lines. Each converter station employs an AC/DC converter to connect the DC transmission lines to an AC network or power grid There are two different types of HVDC power converter technologies, namely, Current Sourced Converters (CSC) and Voltage Sourced Converters (VSC). VSC HVDC systems are the latest technology, and can easily be used: (a) to construct a Multi-terminal HVDC system; (b) for bulk power transmission and system interconnection; (c) for large scale renewable generation integration; and (d) to construct hybrid AC/DC systems, etc.

Examples of commercially available systems using VSC converters include two- or three-level converter topologies and a Multi-level Modular Converter (MMC) topology as well as a cascaded two-level converter topology. Also, for these converter technologies, there are different variants such as half bridge MMC topology, full bridge MMC topology as well as hybrid converter topologies. The hybrid converter topologies, which combine the features and advantages of both of the MMC and 2-level converters, can be formed from a combination of high-voltage series switches, using IGBTs connected in series, and "wave-shaping" circuits based on the same types of "half-bridge" and "full-bridge" cell which make up the MMC. The wave-shaping circuits can be connected either in series or in parallel with the series-switch circuits.

FIGS. 1a and 1b show the main structures of a one-terminal MMC VSC of a HVDC system. As shown in FIG. 1 a, power is supplied to or from an AC system 1. There is a point of common coupling (FCC) 2 of the buses of the VSC converter station, which is connected to a transformer 3 having a star-delta configuration. Power to/from the transformer 3 is provided from/to a MMC 8, via a line that includes three-phase AC shunt filters 4, having a resistance and inductance represented by resistor 5 and inductor 6, and an AC connector 7. On the DC side of the converter are poles P1 and P2 with capacitors 9 and 10 between the pores and earth. P1 is connected to DC terminal pole P3 with the reactance of the line represented by reactance 11, while P2 is connected to DC terminal pole P4 with the reactance of the line represented by reactance 12.

FIG. 1b shows the structure of the MMC converter 8. In this example, there are three bridges 18, 19, 20 for three phases, respectively, in each converter. There are two arms, 18a, 18b; 19a, 19b; 20a, 20b in each bridge. There are sub-modules 13 in each arm, and for an n-level MMC HVDC system there will be n−1 sub-modules 13 in each arm. Each arm 18a, 18b; 19a, 19b; 20a, 20b also has a reactor 14 used to facilitate current control within the phase arms and limit fault currents.

DC fault current suppression is extremely important for a two-terminal or Multi-terminal VSC HVDC power transmission system to suppress both AC and DC currents arising from a DC-side (or DC-grid) short circuit, to control and protect the converters and the DC grid, and hence isolate the faulty DC circuit. Such a control and protection strategy is crucial to all types of MMC VSC HVDC Systems and their variants, in particular for a Multi-terminal configuration.

A full bridge MMC topology can suppress a DC fault current, but needs more semiconductor (IGBT) modules and produces higher power losses. The "full-bridge" MMC VSC can reverse the voltage to counteract the AC side voltage, and in this way the converter bridge can totally block the current flow, thereby suppressing fault currents arising from DC-side short circuit events by the converter control action alone. However, the full bridge MMC topology requires, in principle, twice the number of IGBTs compared with a half bridge MMC of the same rating, resulting in an increase in costs and power losses. Thus, the half-bridge MMC is favoured from the point of view of the economics of the MMC itself. Unfortunately, as well as with a 2-level VSC system, a 3-level VSC system and cascaded 2-level or 3-level systems, currently half bridge MMC VSCs do not possess the ability to suppress fault currents arising from DC-side short circuit events by converter control action. As a consequence, half bridge MMC VSC systems are required to include expensive DC circuit breakers, thereby substantially eroding their economic benefits.

It would thus be desirable to be able to use a half bridge VSC MMC in a two-terminal or Multi-terminal HVDC power transmission system where a DC fault current can be controlled or managed by the action of the VSC converter itself.

SUMMARY OF THE INVENTION

The present invention seeks to provide a fast DC fault control and protection from, or management of, DC fault currents, in VSC-based HVDC power transmission system.

According to a first aspect of the present invention there is provided a Voltage Sourced Converter, VSC, for a High Voltage Direct Current, HVDC, power converter. The VSC comprises a bridge circuit for each of one or more phases of an AC network. The bridge circuit has two arms, each arm connecting the supply to a pole of a DC terminal. Each arm of the bridge circuit has one or more semiconductor modules capable of being switched between an on-condition, in which a capacitor of the module is in-line in the arm of the bridge circuit, and an off-condition, in which the capacitor is out of line. A DC current fault detection arrangement is operable for detecting a fault arising at one or the other of the poles of the DC terminal within the DC converter. A controller is responsive to the detection of the DC current fault for switching one or more of the semiconductor modules in one of the arms of the bridge to the on-condition and one or more of the semiconductor modules of the other arm of the bridge circuit to the off-condition.

According to a second aspect of the present invention there is provided a method of DC fault control in a Voltage Sourced Converter, VSC, for a High Voltage Direct Current, HVDC, power converter. The VSC comprises a bridge circuit for each of one or more phases of an AC network, the bridge circuit having two arms, each arm connecting the supply to a pole of a DC terminal. Each arm of the bridge circuit has one or more semiconductor modules capable of being switched between an on condition, in which a capacitor of the module is in-line in the arm of the bridge circuit, and an off-condition, in which the capacitor is out of line. The method includes detecting a DC current fault arising at one or the other of the poles of the DC terminal. In response to the detection of the DC current fault, one or more of the semiconductor modules in one of the arms of the bridge is switched to the on-condition and one or more of the semiconductor modules of the other arm of the bridge circuit is switched to the off-condition.

Embodiments are directed to converter control and protection of the converter and of the DC grid/system. This includes control and protection of the "half bridge" MMC VSC, "hybrid" converter VSC and other MMC VSC topologies, a cascaded two-level VSC topology, as well as 2-level/3-level VSC topologies and their variants. All of these types of VSC and their variants include the essential features that make up a half-bridge MMC VSC, as discussed in more detail therein and as shown in the embodiments of FIGS. 3, 3a, 3b. Embodiments provide the ability to suppress fault currents arising from DC-side short circuit events using a novel control strategy. Hence expensive DC circuit breakers are no longer needed on the DC side, or in the DC grid.

The embodiments described apply fast control and protection of the half bridge MMC VSC, although the control and protection is equally applicable to other variants that utilise a VSC. Embodiments may cover the following general applications and variants:

a) MMC VSC HVDC applications that include half-bridge MMC, full bridge MMC and hybrid converter topologies as well as their variants.
b) The IGBT modules could be replaced by other types of semiconductor modules that can perform similar functions,
c) THE IGBT (or similar) semiconductor module (or modules), or variants thereof, may be placed in the arms of the MMC, as described. Alternatively, or additionally, as shown in FIGS. 3a and 3b, a module or modules may be placed between the DC terminal and a DC bus or a DC connector or another DC—terminal. FIGS. 3a-3b show a variation of the MMC VSC of the present invention.
d) The new control strategy can be applied to fast control and protection of a two-terminal or multi-terminal MMC VSC HVDC with a DC grid of any complexity (for example a T connection, or a radial connection, or a meshed grid connection, etc.) and with any type of DC fault (such as DC line to ground and DC line to line faults, etc.).
e) The new control strategy an be applicable to 2 and 3 level or multi-level VSC HVDC systems as well as their variants.
f) The new control strategy is primarily developed to provide fast control and protection of two-terminal or multi-terminal MMC VSC HVDC systems when DC faults arise. The control strategy is also useful to provide fast control and protection against AC faults by maximising the branch equivalent impedance ($Z_{ARM}$— see below) to minimise the AC fault currents through the converters, and at the same time by isolating the DC grid side from the AC side to reduce the DC current due to the AC faults. FIGS. 3 and 5 show embodiments incorporating all features that perform this isolation.
g) The new control strategy is applicable to cascaded two-level VSC HVDC systems (either two-terminal or multi-terminal).
h) The new control strategy can also be used to provide fast control and protection of a two-terminal or a multi-terminal MMC VSC HVDC system (or cascaded two-level VSC HVDC systems) in the case of a failure of communications between the terminals or due to the failure of coordinated control between the terminals when system operation becomes abnormal. When significant changes of physical parameters of the converters, such as powers or currents, are detected, by using the converter measurements, the fast control and protection can isolate the interactions between the converter terminals.

BRIEF DESCRIPTION OF THE DRAWINGS

FIG. 1c shows the structure of a sub module 13 of an MMC converter 8, as shown in FIGS. 1a and 1b, and of a type suitable for use in embodiments of the invention (although other similar devices could also be used). The sub-module 13 has a pair of Insulated Gate Bipolar Transistors (IGBTs) 15, or other semiconductor devices that perform a similar function, and shown as IGBT1 and IGBT2. Each IGBT 15 has an associated diode 16 in parallel, and a capacitor 17 as shown. The capacitances of all the capacitors 17 in sub modules 13 of the MMC converter 8 are equal, which means that for each arm of an n-level MMC HVDC system, CSM1=CSM2= . . . =CSMn−1.

In normal operation, each sub module 13 of the MMC 8 of the HVDC system can work in two different states. One state is the "capacitor-on" state shown in FIG. 1d, in which IGBT1 is switched on and IGBT2 is switched off. In this condition the capacitor 17 in each sub module 13 is connected into the main circuit of the bridge arm, and the voltage output by the sub module equals the voltage of the capacitor 17. This status is also described as the on-condition of the sub-module 13. Note that because IGBT1 is switched on, the capacitor voltage applies across IGBT2 and its diode, and as this is a reverse voltage the diode does not conduct. The other state is the "capacitor-off" state shown in FIG. 1e, in which IGBT1 is switched off and IGBT2 is switched on. In this condition, the capacitor 17 in each sub module 13 is bypassed, and the voltage output by the sub module is effectively 0 (or very low). This state is also described as the off-condition of the sub module 13.

Figure 1C:
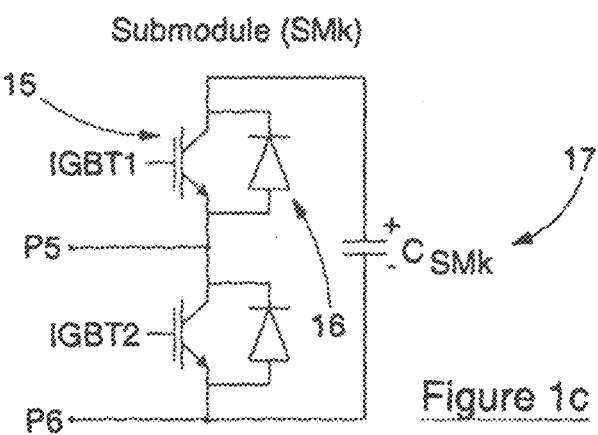
Figure 1E:
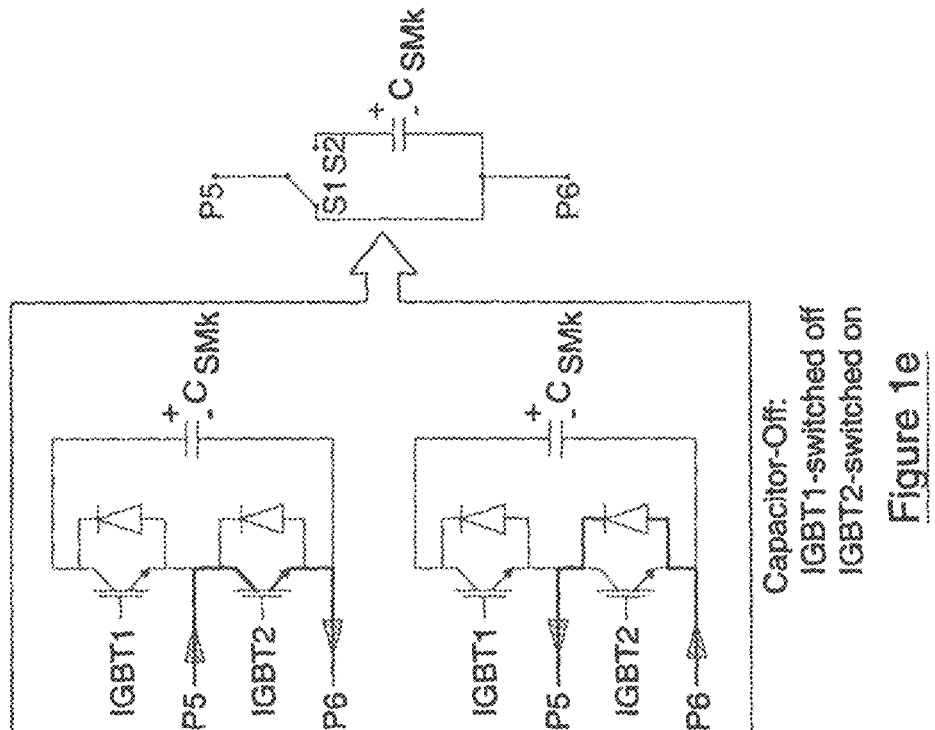
Figure 1D:
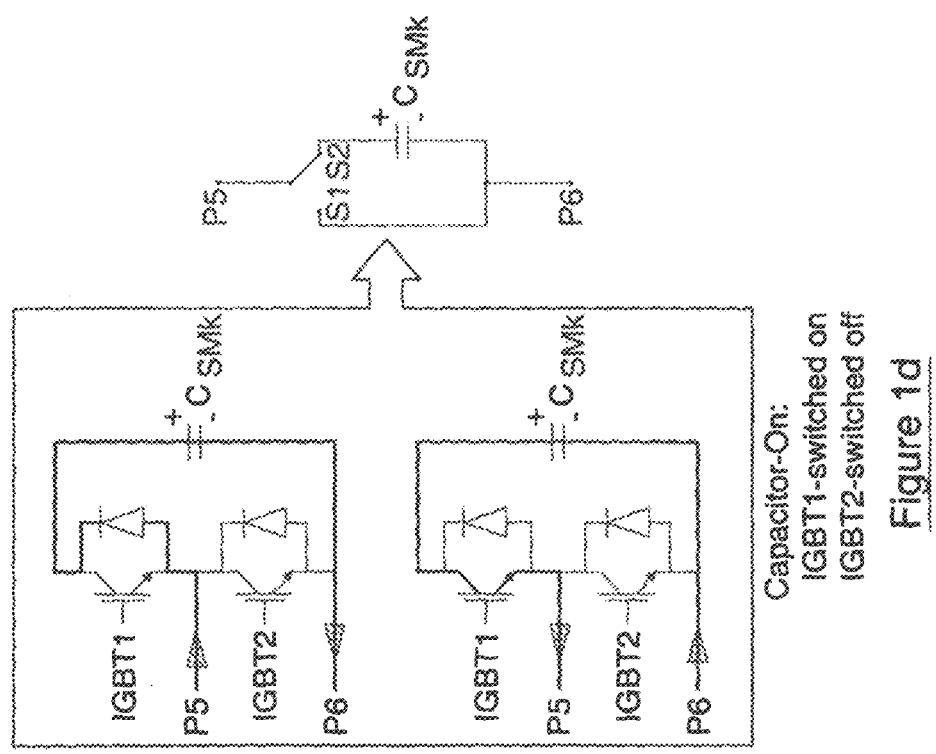
Figure 2:
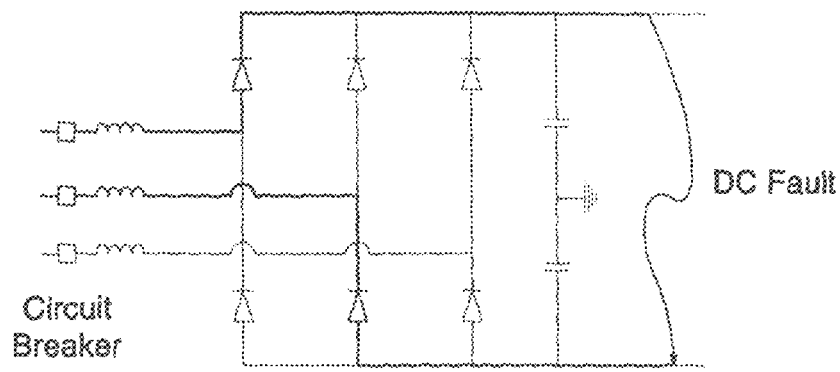
FIG. 2 is a simplified circuit diagram showing a current path in a DC short circuit fault of a half-bridge VSC.

As already indicated, existing power converters, such as the 2-level/3-level VSC HVDC and the half bridge MMC VSC HVDC systems, which do not have the ability to suppress fault currents arising from DC-side short circuit events by means of converter action. They require highly specialised DC breakers, or (more usually) an AC breaker feeding the converter must be opened to clear the fault. This is because, although it is possible to turn-off the IGBTs 15 (see FIGS. 1c-1e) in the converter very rapidly, this only stops current flow in one of the two possible directions. Each IGBT 15 is equipped with an integral inverse parallel diode 16, which cannot be turned off. Consequently, even with all IGBTs turned off, the converter bridge behaves as an uncontrolled diode rectifier as shown in FIG. 2. Although the majority of VSC-HVDC systems built today are simple point-to-point cable systems where DC faults are rare and tripping of AC circuit breakers can be tolerated, this shortcoming will need to be addressed for Multi-Terminal MMC VSC-HVDC systems. Currently such systems have to rely on MMCs that use full bridge topologies instead of half bridge or rely on MMCs that use half bridge and need very expensive DC circuit breakers, while the former approach using full bridge MMC topologies suffers from a near-doubling of the number of semiconductor devices, resulting in higher capital costs and power losses.

Figure 1A:
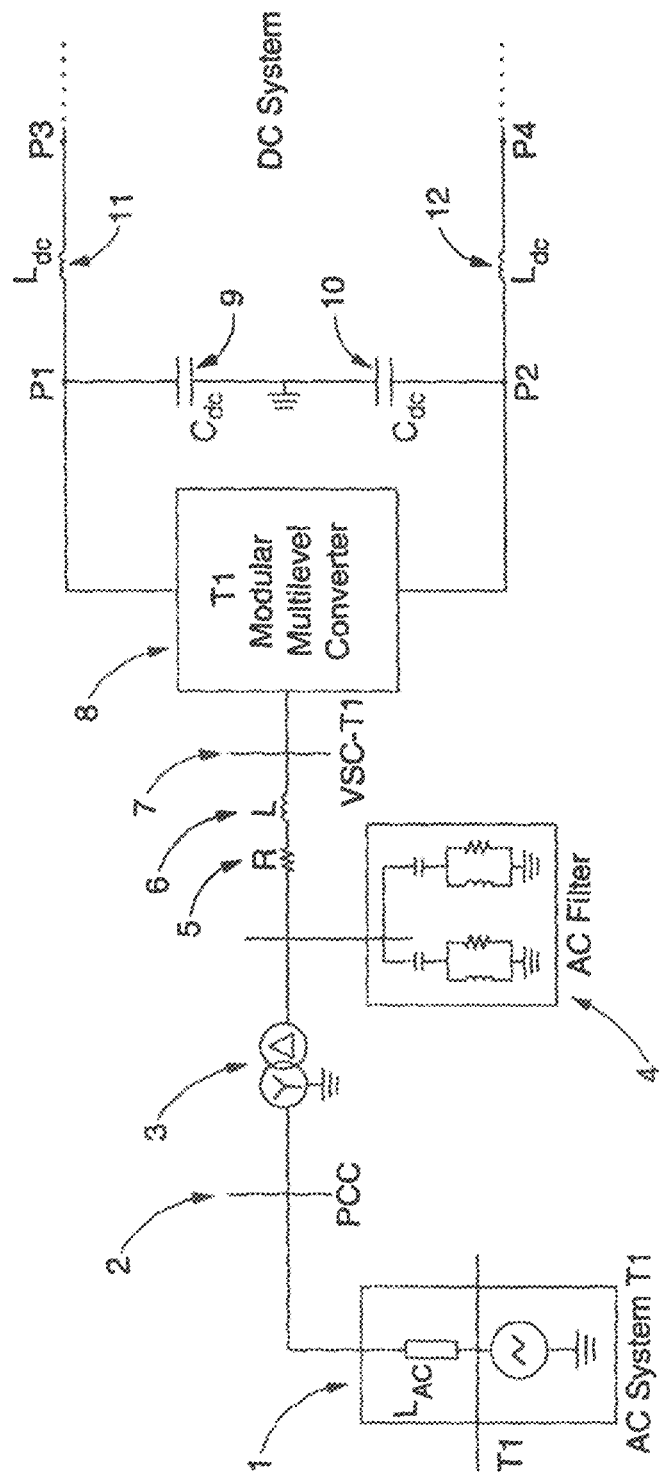
FIGS. 1a-1e show the main structures of a one-terminal MMC VSC of a HVDC system.
Figure 1B:
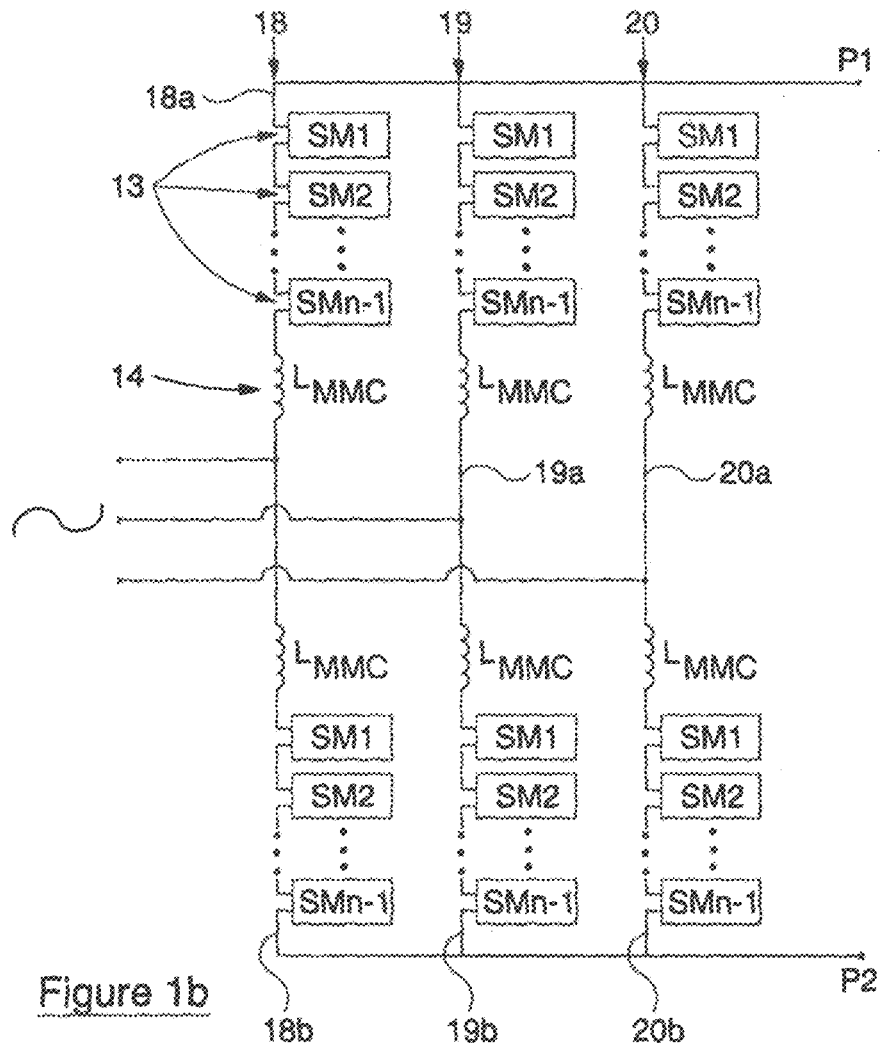

The embodiments described herein utilise a control strategy, in which when a DC fault appears between P1 and P3 (as shown in FIG. 1a), one or more (even all) of the sub modules in one arm of each bridge are turned off (IGBTs switched to the off-condition) and one or more (even all) of the sub modules in the other arm of each bridge are turned on (IGBTs switched to the on-condition).

Figure 3:
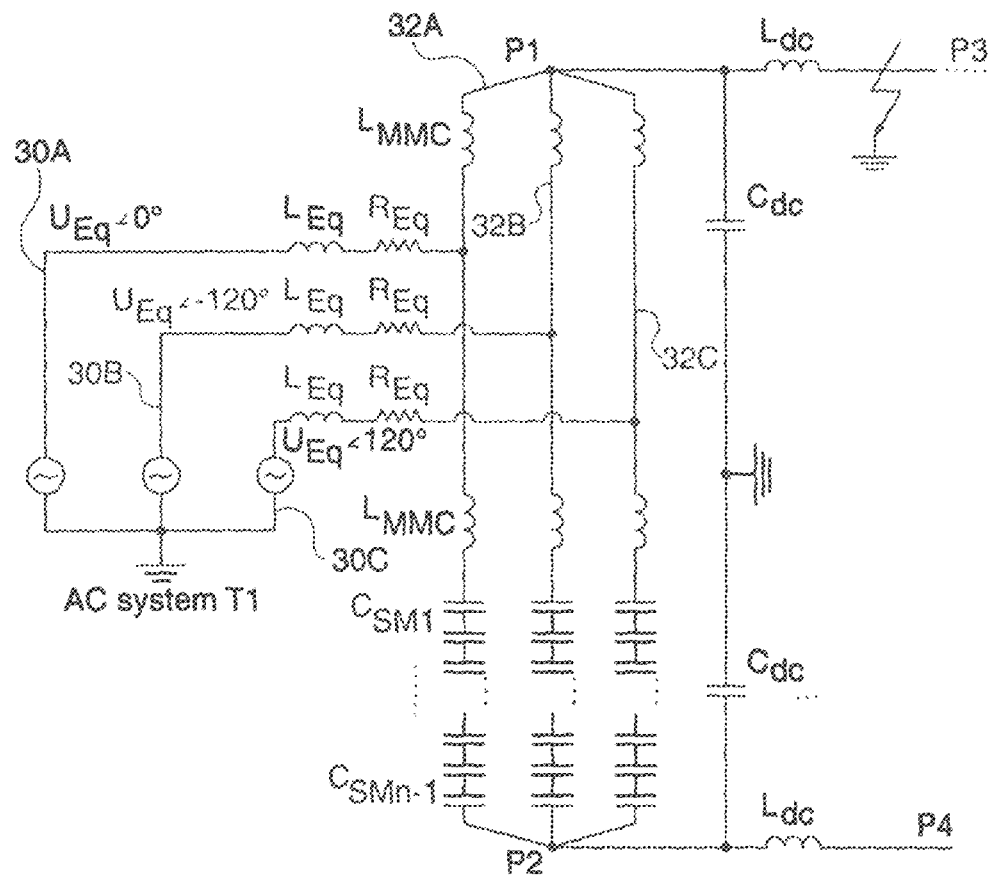
FIG. 3 is an equivalent circuit diagram of an MMC VSC at a condition for controlling a DC fault in accordance with an embodiment of the invention.
Figure 3A:
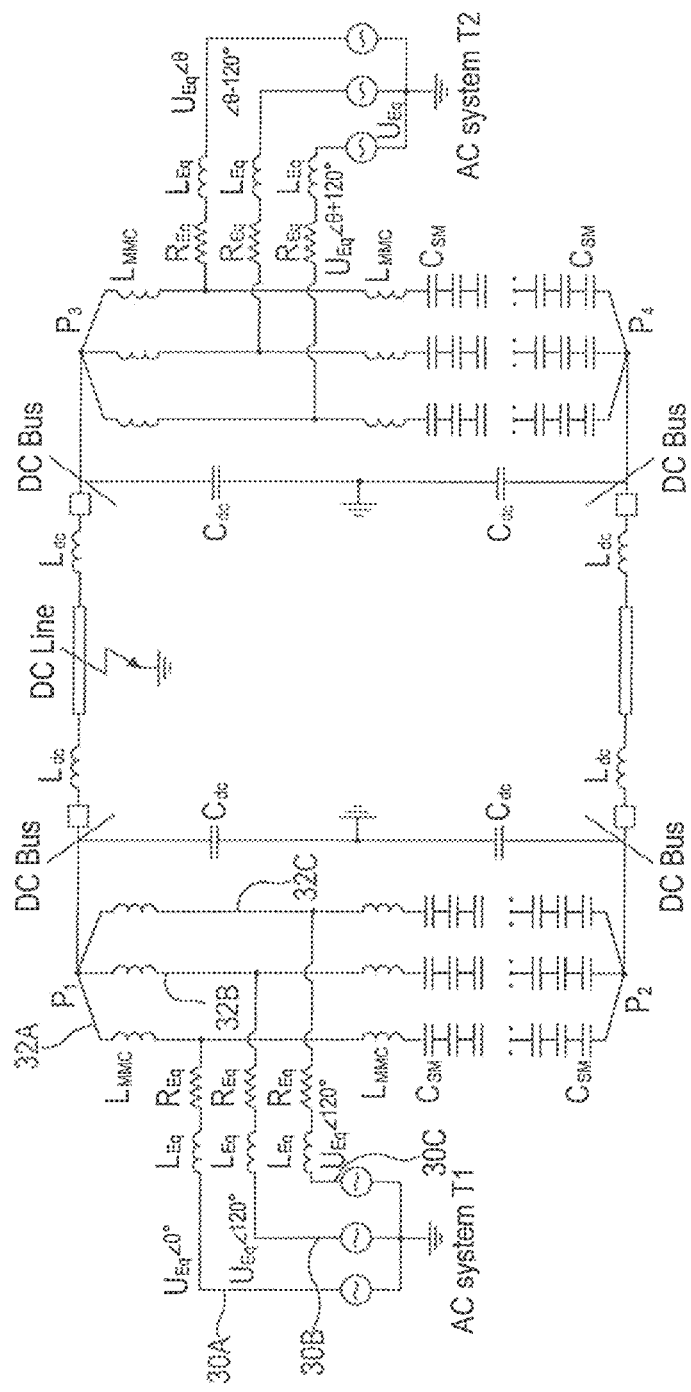
FIGS. 3a-3b show a variation of the MMC VSC of the present invention.
Figure 3B:
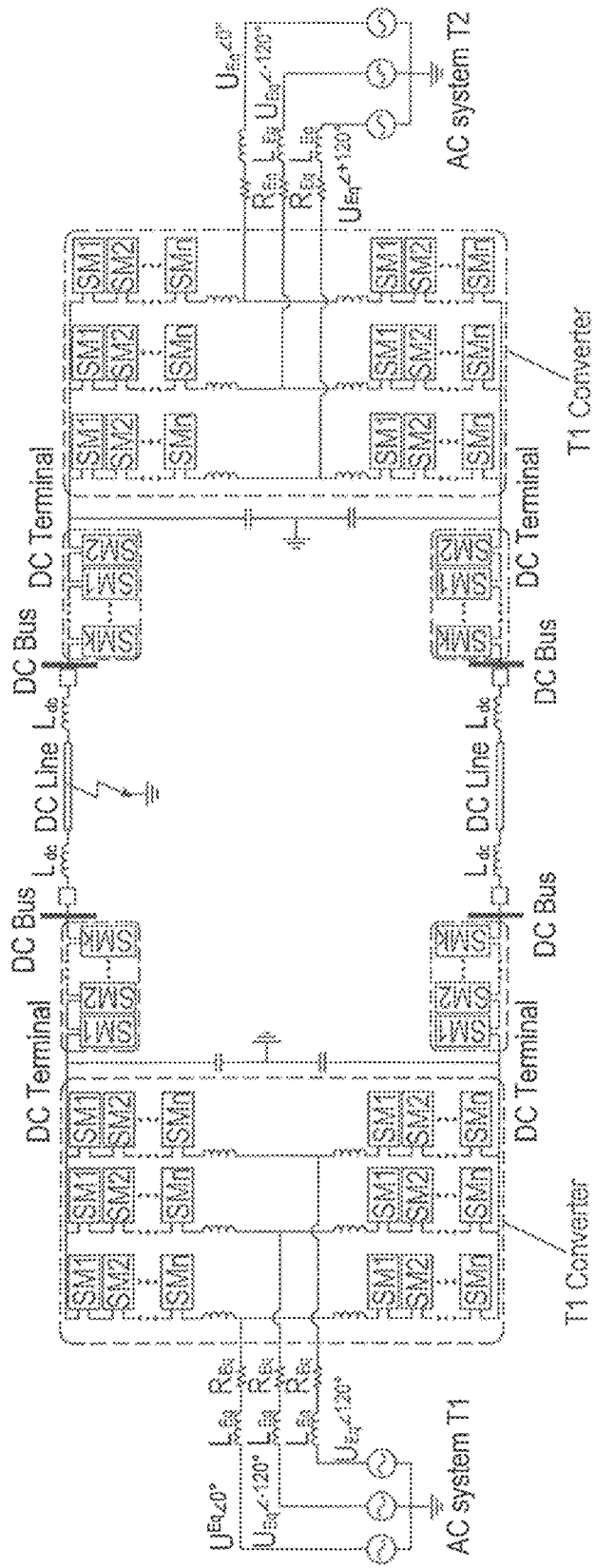

Typically, the scheme of the new control strategy is to turn on all the sub modules in one arm of each bridge and turn off all the sub modules in the other arm of each bridge. The state of the MMC HVDC system with this control strategy applied (i.e. in the event of a DC fault) produces a circuit as shown in FIG. 3. In FIG. 3, a balanced control is assumed whereby the three single phase circuits (of phases A, B, C) are identical and hence balanced. Such a balanced structure can be beneficial for controlling the MMC, but the principles described here are applicable to unbalanced situations where the three single phase circuits are not necessarily identical. As shown in FIG. 3 the three phases of the AC system are each provided on an identical line 30A, 30B, 30C having a line inductance $L_{Eq}$ and resistance $R_{Eq}$ connected to respective half bridge circuits 32A, 32B, 32C. One arm of each half bridge circuit has had its semiconductor modules switched to the off-condition (i.e. capacitors are out of line) such that the only impedance is the MMC inductance $L_{MMC}$. The other half of each half bridge has its semiconductor modules switched to the on-condition (i.e. capacitors are in-line) as shown by the capacitors $C_{SM1} \ldots C_{SMn-1}$.

Figure 4:
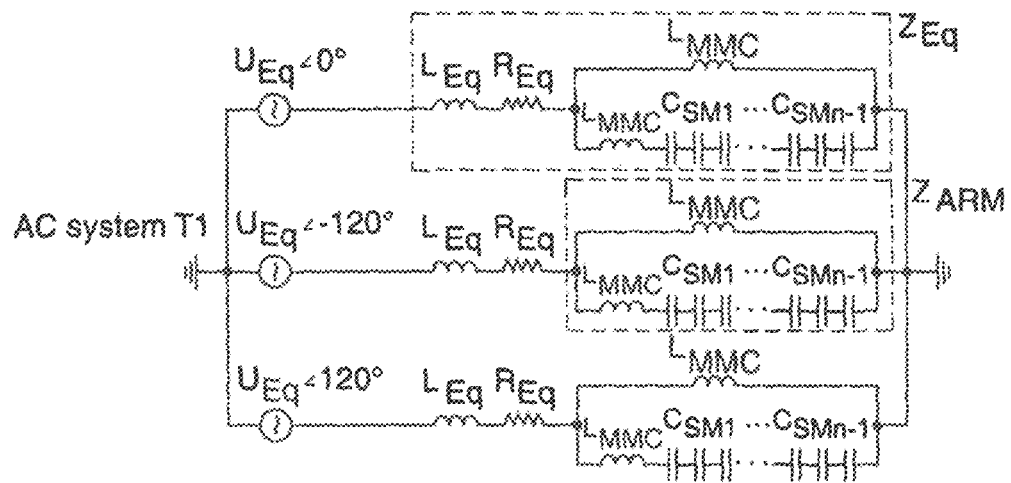
FIG. 4 is an AC circuit diagram equivalent to the circuit diagram of FIG. 3.

For this example, with a balanced 3-phase AC side using the new control strategy, the equivalent AC circuit diagram of the MMC is shown in FIG. 4. In this equivalent circuit, it is assumed that when the DC fault appeared between P1 and P3 (shown in FIG. 1a), the new control strategy turned on all the sub modules (switching on all the capacitors in the sub modules) in one arm of each bridge and turned off all the sub modules (bypassing all the capacitors) in the other arm of each bridge. Although other schemes can be used in accordance with the new control strategy, the benefits of the scheme include that: (a) branch equivalent impedance (actually reactance) $Z_{ARM}$ can be maximised and consequently $Z_{Eq}$ can be maximised, which is useful for limiting the AC currents; and (b) it reduces the voltage stress to each capacitor being switched on in the arm.

Because $C_{SM1} = C_{SM2} = \ldots = C_{SMn-1} = C_0$, then $$Z_{ARM} = j\omega L_{MNC} // \left(j\omega L_{MMC} - \frac{n-1}{j\omega C_0}\right)$$

but because $$j\omega L_{MMC} << \frac{n-1}{j\omega C_0}$$

we have $Z_{ARM} \approx j\omega L_{MMC}$, which is the maximum impedance of $Z_{ARM}$.

When $Z_{ARM}$ can be maximised, then $Z_{Eq}$ is also maximised, and so the AC currents on the AC side of the MMC can be minimised. Also, if the Inductance Value of $L_{MMC}$ is chosen carefully, all of the IGBTs can operate with a current that is less than the rated value of the IGBT even when experiencing the most severe DC fault condition.

Figure 5:
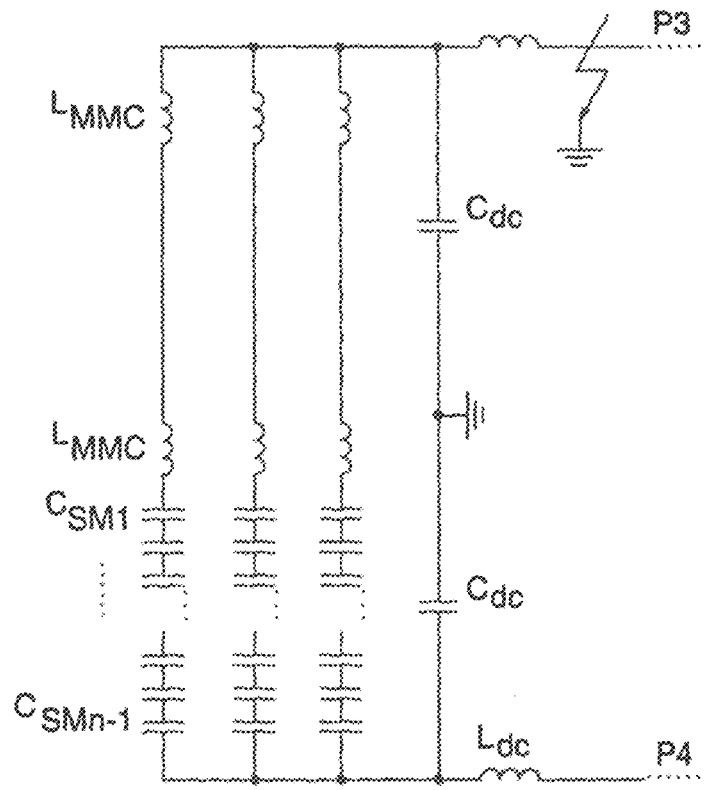
FIG. 5 is a DC circuit diagram equivalent to the circuit diagram of FIG. 3.

FIG. 5 is the equivalent DC circuit diagram of the MMC. As shown in FIG. 5, because at least one (and in this example all) of the capacitors $C_{SM1} \ldots C_{SMn}$ in the semiconductor modules in each arm of the half bridge MMC connected to the DC terminal pole P4 has been switched to the on condition, no DC current path is available in the DC circuit diagram as shown in FIG. 5, which means that the DC current is blocked and the DC current path is eliminated as soon as the new control strategy is applied.

In addition, all the electrical energy stored in the capacitors and inductors (or inductive circuits) during the time before the fault arose and the new (emergency) control strategy was applied, will be released as a form of LC oscillation. Under the balanced system as shown in FIG. 3, the LC oscillation can make the fault current at the DC terminal, as well as in the DC lines take the form of AC current, which has an average value close to zero and will cross zero regularly with each oscillation. In addition, most importantly with this emergency DC fault control, the oscillating AC current at the DC side becomes relatively small and it decays over time. As a result the DC line with the fault can easily be opened at the instant when the DC fault current crosses zero by using either simple power electronic switches, or isolators, or AC circuit breakers (which are much cheaper than DC circuit breakers).

Figure 6:
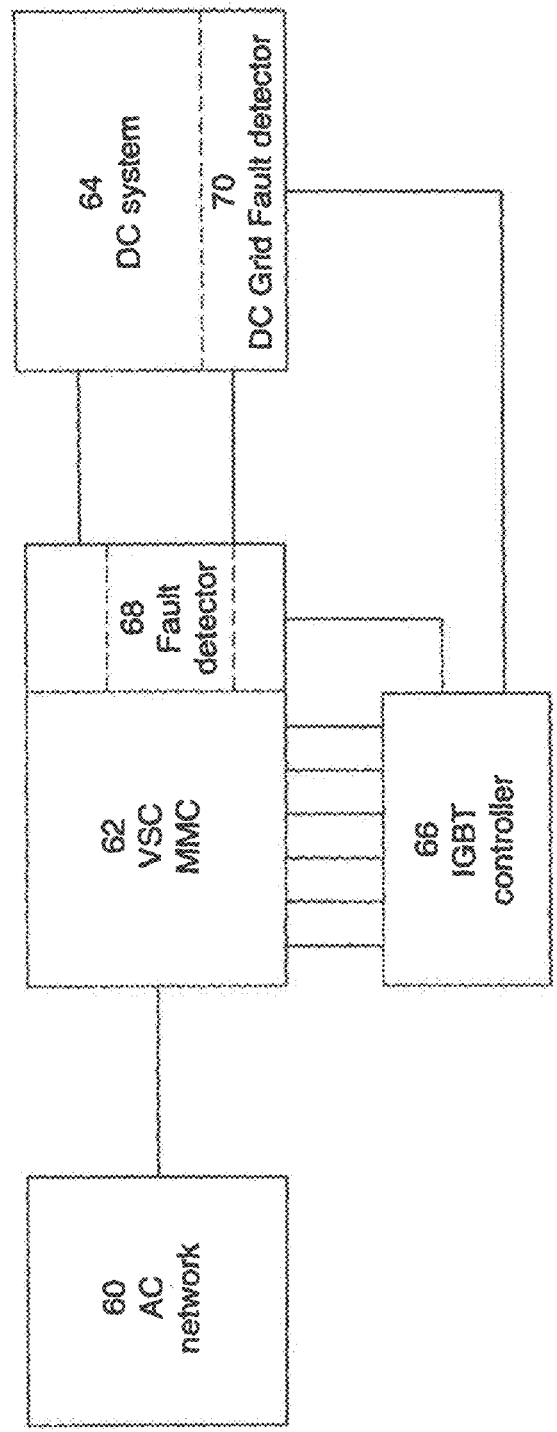
FIG. 6 is a schematic block diagram of a AC/DC power converter in accordance with an embodiment of the invention.

FIG. 6 is a high-level block diagram illustrating the components of an HVDC power transmission system between an AC network 60 and a DC system 64, using a MMC VSC power converter 62 as described above. The operation of the IGBTs (or similar devices) in the MMC VSC 62 is controlled by an IGBT controller 66, and is used to switch the IGBTs in the semiconductor modules in the MMC 62 between the off-condition and the on-condition. In addition, the system includes a DC Grid fault detector 70, which can detect the presence of a DC fault current on the DC side. Within the MMC converter, there is also a built-in fault detector 68, which is used to detect either AC faults or DC faults. The controller of the MMC can receive detection signals from these detectors 68 and 70. Although the fault detectors 68, 70 can be applied based on different principles tailored to the system operations, the most effective detection should be with over-current detection. For instance, if there is an overcurrent detected (measured) by fault detector 68, the signal will be sent to the controller 66 and then the fast protection and control proposed will be taken. Similarly when a DC grid fault is detected by the DC grid fault detector 70, the signal will be sent to the controller 66 and then the fast protection and control procedure will take place. On detecting a fault, the signal provided by the fault detector 68 or DC grid fault detector 70 causes the IGBT controller 66 to switch the IGBTs in accordance with the emergency fault control strategy described above.

The invention claimed is:
1. A Voltage Sourced Converter (VSC) for a High Voltage Direct Current (HVDC) power converter, the VSC being a Multi-level Modular Converter (MMC), the VSC comprising:
 a bridge circuit for each of one or more phases of an AC network, the bridge circuit having two arms, each arm connecting the supply to a pole of a DC terminal, wherein each arm of the bridge circuit has an inductance, a branch equivalent impedance, one or more semiconductor modules capable of being switched between an on-condition, in which a capacitor of the semiconductor module is in-line in the arm of the bridge circuit, and an off-condition, in which the capacitor is out of line;
  a DC current fault detection arrangement for detecting a fault arising within the VSC or at one or the other of the poles of the DC terminal;
  a built-in fault detector for detecting either AC faults or DC faults: and
  a controller responsive to the detection of any of the current faults by the DC current detection arrangement and/or the built-in fault detector for switching the one or more semiconductor modules in one of the arms of the bridge circuit to the on-condition, and the one or more semiconductor modules of the other arm of the bridge circuit to the off-condition, such that electrical energy stored in the capacitors and inductances is released in the form of an LC oscillation and the branch equivalent impedance can be maximized in order to minimize AC current through the VSC.

2. The Voltage Sourced Converter of claim 1 wherein the controller in response to the detection of the DC current fault, switches all the semiconductor modules in one of the arms of the bridge circuit to the on-condition and all the semiconductor modules of the other arm of the bridge circuit to the off-condition.

3. The Voltage Sourced Converter of claim 1 wherein the one or more semiconductor modules comprises a capacitor and semiconductor devices that perform the function of an Insulated Gate Bipolar Transistor (IGBT), wherein the semiconductor devices are operable for switching between the on-condition, in which the capacitor of the semiconductor module is in-line in the corresponding arm of the bridge circuit, and an off-condition, in which the capacitor is bypassed in the corresponding arm of the bridge circuit.

4. The Voltage Sourced Converter of claim 3 wherein each of the semiconductor devices comprises an integral inverse parallel diode.

5. The Voltage Sourced Converter of claim 1 wherein one or more semiconductor modules is placed between the DC terminal and one of a DC bus, DC connector, and another DC terminal.

6. A method for controlling current faults in a Voltage Sourced Converter (VSC) for a High Voltage Direct Current (HVDC) power converter, the VSC being a Multi-level Modular Converter (MMC), the VSC comprising a bridge circuit for each of one or more phases of an AC network, the bridge circuit having two arms, each arm connecting the supply to a pole of a DC terminal, each arm of the bridge circuit having one or more semiconductor modules capable of being switched between an on-condition, in which a capacitor of the semiconductor module is in-line in the arm of the bridge circuit, and an off-condition, in which the capacitor is out of line, the method comprising:
  detecting a DC current fault arising within the VSC or at one or the other of the poles of the DC terminal;
  detecting an AC current fault; and
  in response to the detection of the DC current fault and/or the AC current fault, switch the one or more semiconductor modules in one of the arms of the bridge circuit to the on-condition, and switch the one or more semiconductor modules of the other arm of the bridge circuit to the off-condition, such that electrical energy stored in the capacitors and inductances is released in the form of an LC oscillation and the branch equivalent impedance can be maximized in order to minimize AC currents through the VSC.

7. The method of claim 6 wherein, in response to the detection of the DC current fault, all of the semiconductor modules in one arm of each bridge circuit are turned on and all the semiconductor modules in the other arm of each bridge circuit are turned off.

8. The method of claim 6, further comprising isolating a DC grid side from an AC side of the VSC to reduce a DC current due to the AC fault.

* * * * *